(12) United States Patent
Wang et al.

(10) Patent No.: US 8,500,470 B2
(45) Date of Patent: Aug. 6, 2013

(54) PLUG CONNECTOR HAVING A RELEASING MECHANISM AND A CONNECTOR ASSEMBLY HAVING THE SAME

(75) Inventors: Chien-Chiung Wang, New Taipei (TW); Qing-Man Zhu, Kunshan (CN); Jian-Jun Zhu, Kunshan (CN); Jerry Wu, Irvine, CA (US)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 53 days.

(21) Appl. No.: 13/335,233

(22) Filed: Dec. 22, 2011

(65) Prior Publication Data

US 2012/0164860 A1 Jun. 28, 2012

(30) Foreign Application Priority Data

Dec. 22, 2010 (CN) .......................... 2010 2 0674435

(51) Int. Cl.
*H01R 13/62* (2006.01)
(52) U.S. Cl.
USPC .............................. 439/159; 439/352; 385/53
(58) Field of Classification Search
USPC ................... 439/152, 159, 352, 357; 385/92, 385/53
See application file for complete search history.

(56) References Cited

U.S. PATENT DOCUMENTS

| 6,746,158 | B2 | 6/2004 | Merrick | |
|---|---|---|---|---|
| 7,204,712 | B2 * | 4/2007 | Schwiebert et al. | 439/352 |
| 7,212,410 | B2 * | 5/2007 | Larson | 361/726 |
| 7,281,863 | B2 * | 10/2007 | Yamada et al. | 385/92 |
| 7,422,464 | B2 * | 9/2008 | Lloyd et al. | 439/352 |
| 8,403,695 | B2 * | 3/2013 | Wang et al. | 439/352 |

\* cited by examiner

*Primary Examiner* — Khiem Nguyen
(74) *Attorney, Agent, or Firm* — Wei Te Chung; Ming Chieh Chang

(57) ABSTRACT

A connector assembly includes a receptacle (200) having a latching tab (2) defining a latching hole (21) and a plug connector (100). The plug connector includes a housing (1) having a latching nose (111) for latching with the latching hole and a releasing mechanism. The releasing mechanism includes two resisting beams (53) disposed on the housing and having two protrusions (531), a puller (71), and an operator (72) having two guiding portions (722) projecting toward and in front of the protrusions. The guiding portions slide beneath the protrusions, in response to a rearward movement of the puller, to tilt the resisting beams upwardly and lift the latching tab from a latched position to a released position for releasing the latching nose from the latching hole.

11 Claims, 8 Drawing Sheets

PLUG CONNECTOR HAVING A RELEASING MECHANISM AND A CONNECTOR ASSEMBLY HAVING THE SAME

BACKGROUND OF THE INVENTION

1. Field of the Invention

The present invention relates to a plug connector and a connector assembly, and more particularly to a SFP (Small Form-factor Pluggable) plug connector adapted for releasably latching with a receptacle and a connector assembly having the same.

2. Description of Related Art

U.S. Pat. No. 6,746,158 issued to Merrick on Jun. 8, 2004 discloses an SFP transceiver connector for mating with a receptacle having a latching tab defining a latching hole. The transceiver connector comprises a housing having a latching nose for engaging with the latching hole, a releasing mechanism assembled to the housing and a pair of recesses. The releasing mechanism includes an actuator, a lever assembled at one end of the actuator, and a pair of releasing portions formed at another end of the actuator and plunged in recesses. The releasing portions climb outwardly of the recesses, in response of the rearward movement of the lever, to upwardly lift the latching tab to thereby release the latching nose from the latching hole.

A plug connector having a differently configured releasing mechanism and a connector assembly having the same are desired.

SUMMARY OF THE INVENTION

Accordingly, an object of the present invention is to provide a plug connector and a connector assembly having the same, the plug connector including a releasing mechanism having a releasing portion lifting a resisting beam to take a releasing operation.

In order to achieve the object set forth, a connector assembly includes a receptacle having a latching tab defining a latching hole and a plug connector. The plug connector includes a housing having a latching nose for latching with the latching hole and a releasing mechanism. The releasing mechanism includes two resisting beams disposed on the housing and having two protrusions, a puller, and an operator having two guiding portions projecting toward and in front of the protrusions. The guiding portions slide beneath the protrusions, in response to a rearward movement of the puller, to tilt the resisting beams upwardly and lift the latching tab from a latched position to a released position for releasing the latching nose from the latching hole.

The guiding portion formed on the operator is cooperated with the protrusion formed on the gasket to lift the latching tab from the latched position to the released position. The releasing mechanism of the present invention has a configuration different from that of the conventional releasing mechanism and could take a more simple releasing operation.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Figure 1:
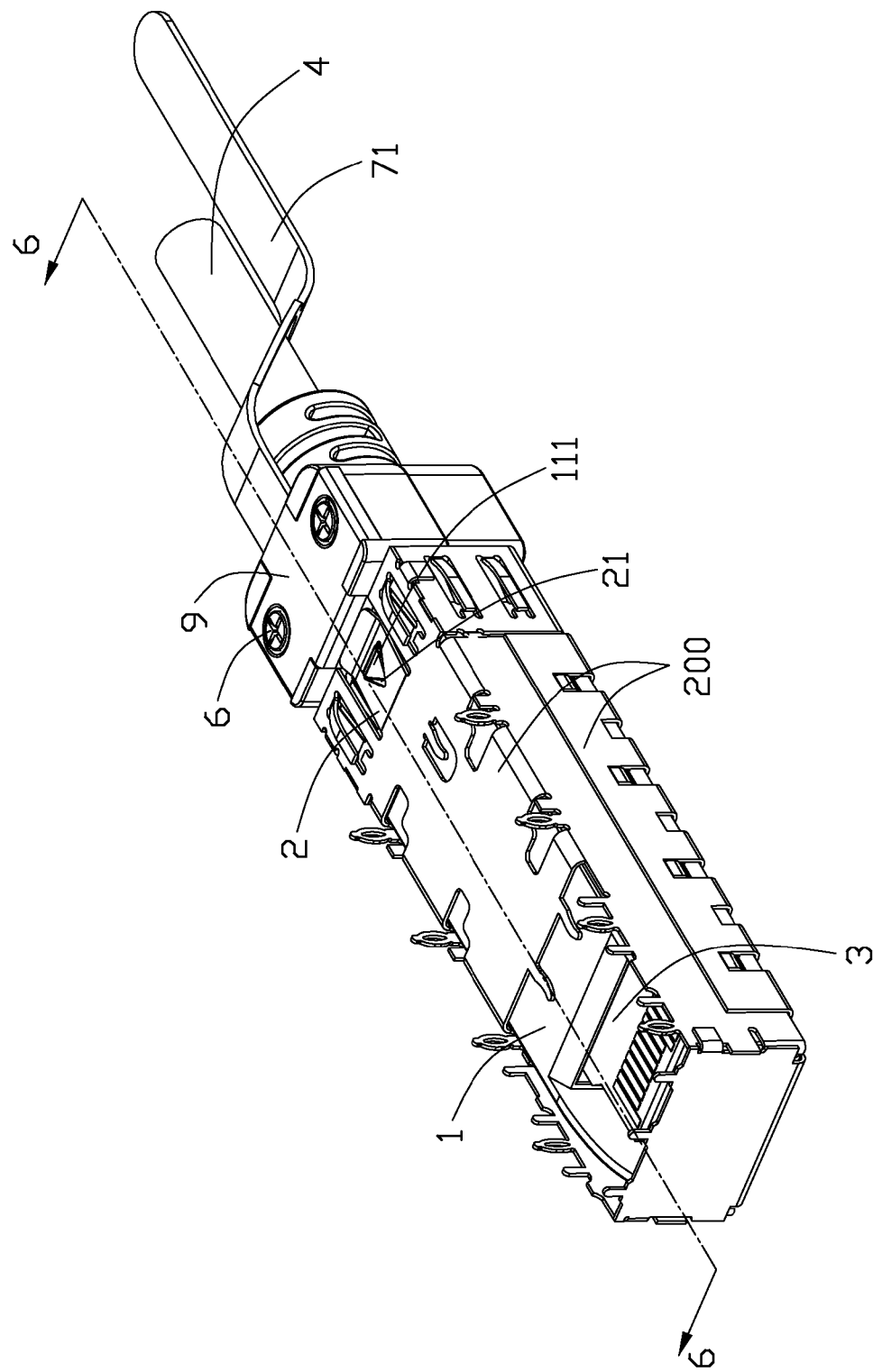
FIG. 1 is an assembled perspective view showing a connector assembly in accordance with the present invention.

Referring to FIG. 1, a connector assembly in accordance with the present invention includes a receptacle 200 having a latching tab 2 defining a latching hole 21, and a plug connector 100 inserted in the receptacle 200.

Figure 2:
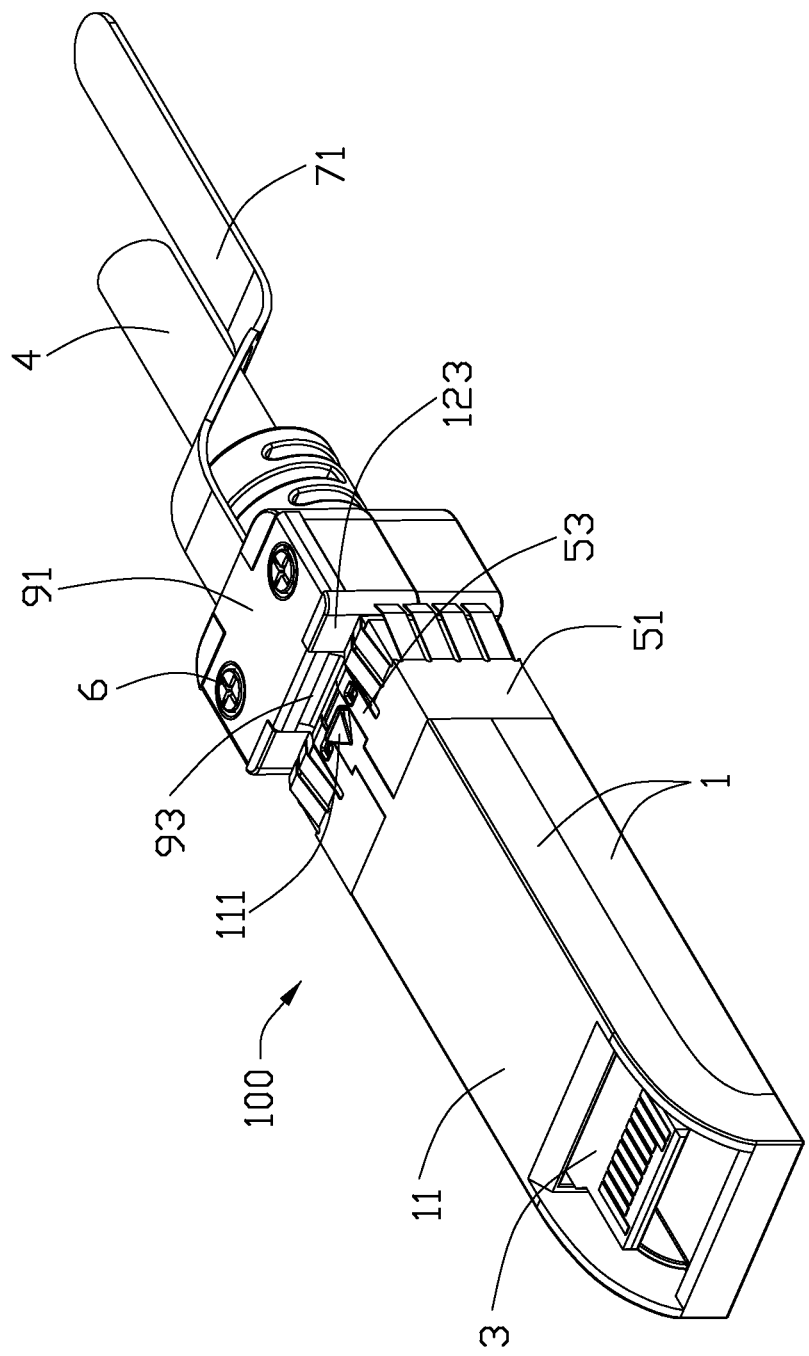
FIG. 2 is an assembled perspective view showing a plug connector as shown in FIG. 1.
Figure 3:
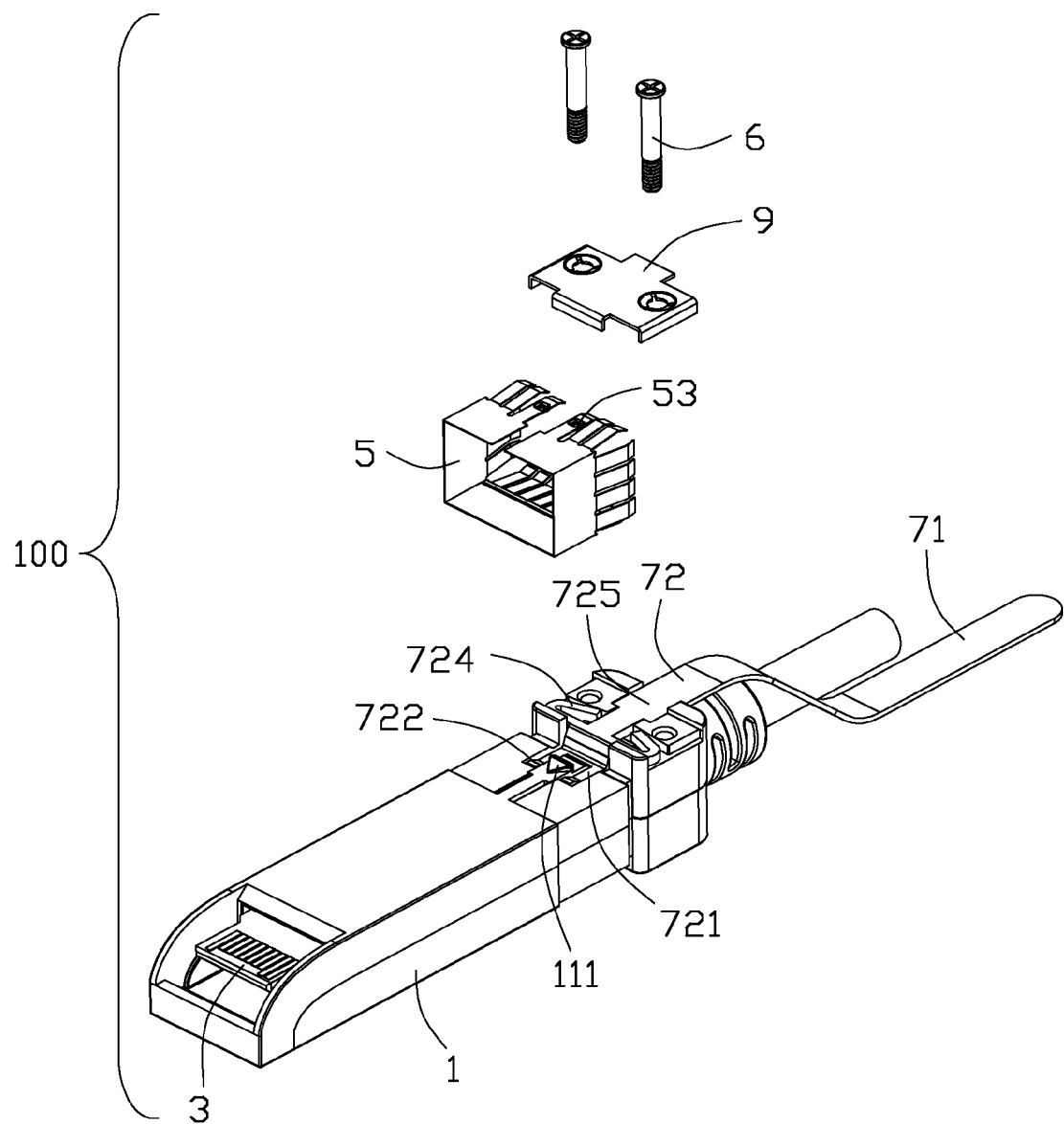
FIG. 3 is a partially exploded perspective view showing the plug connector.
Figure 4:
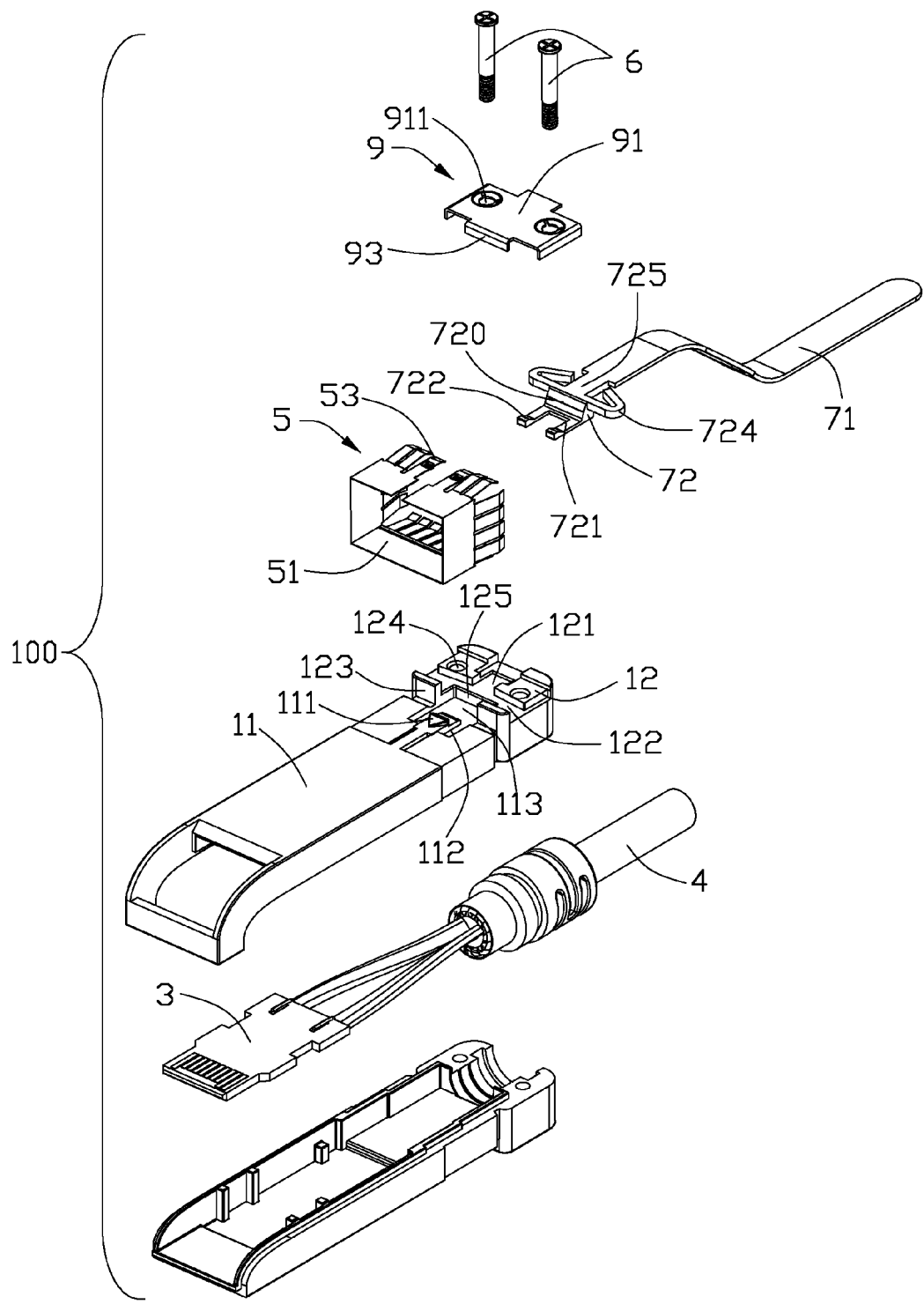
FIG. 4 is an exploded perspective view showing the plug connector.

Referring to FIGS. 2 to 4, the plug connector 100 comprises a housing 1 insertion of at least one board 3 connected with a cable 4, a gasket 5 attached to the housing 1, a releasing mechanism assembled to the housing 1, a cover 9 and a pair of screws 6.

The housing 1 comprises an upper face 11 and a top face 12 disposed at a level higher than that of the upper face 11. The housing 1 includes a latching nose 111 projecting from the upper face 11, a pair of retaining recesses 112 defined at two opposite sides of the latching nose 111 and a receiving recess 113 communicating with the pair of retaining recesses 112. The housing 1 includes a pair of supporting portions 123 extending upwardly from the top face 12, a primary recess 121 and a pair of periphery recesses 122 defined on the top face 12, and a stepped portion 125 disposed between the receiving recess 113 and the primary recess 121 for preventing the releasing mechanism from dropping. The housing 1 further defines a mounting holes 124 extending downwardly from the top face 12.

Figure 5:
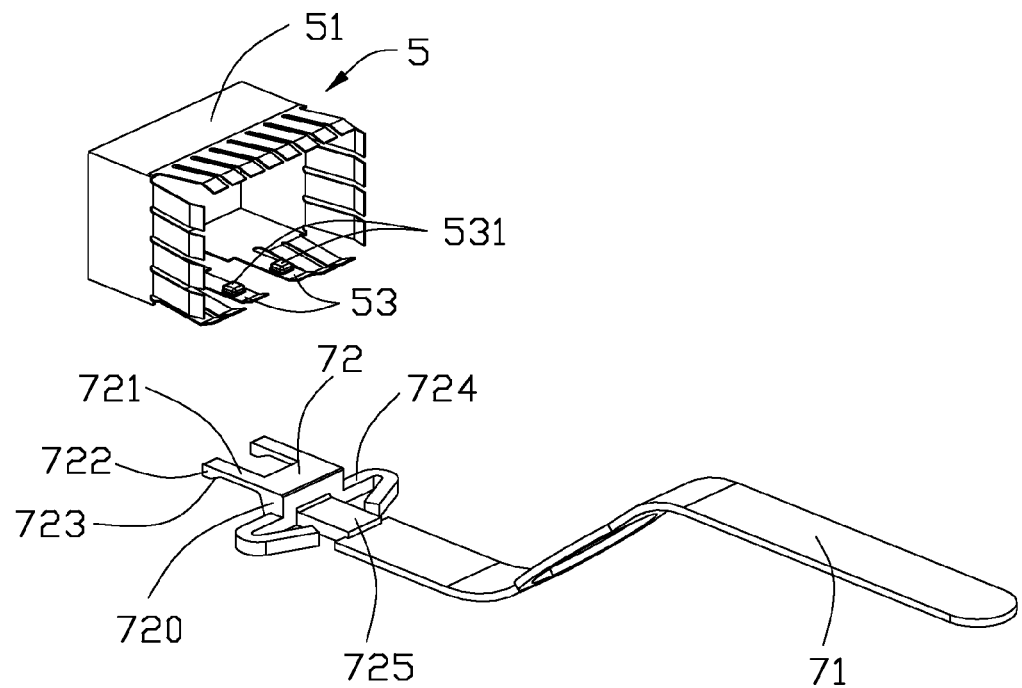
FIG. 5 is a perspective view showing a releasing mechanism.

The releasing mechanism comprises a gasket 5, a puller 71 and an operator 72. The puller 71 and the operator 72 could be formed into one piece in accordance with the preferred embodiment and could be formed into two pieces. In conjunction with FIG. 5, the gasket 5 is attached to the housing 1 and includes a plate 51 bent from a punched metal sheet and a pair of resisting beams 53 extending rearwardly from the plate 51 and situated on the upper face 11 of the housing 1. Each resisting beam 53 has a protrusion 531 projecting downwardly therefrom.

The operator 72 includes a base portion 720, a pair of beam portions 721 extending forwardly from the base portion 720, a body portion 725 connected with the base portion 720, and a pair of resilient portions 724 extending sidewardly from the body portion 725. In conjunction with FIGS. 6 and 7, each beam portion 721 has an upwardly projecting guiding portion 722 having a guiding face 723 inclining rearwardly and downwardly. Each resilient portion 724 is formed into a substantially compressible U-shape.

The cover 9 includes a top wall 91 defining a pair of inserting holes 911 and a downwardly extending tongue portion 93.

Referring to FIGS. 1-6, in assembling of the plug connector 100, the board 3 is received in the housing 1. The operator 72 is mounted on the housing 1, with the base portion 720 slidably accommodated in the receiving recess 113 and the pair of beam portions 721 slidably received in the retaining recesses 112. The body portion 725 is received in the primary recess 121 and the pair of resilient portions 724 are compressible in the periphery recesses 122.

The gasket 5 is attached to the housing 1, with the pair of protrusions 531 projecting toward and behind the guiding portions 722. Each guiding portion 722 is situated between the resisting beam 53 and the retaining recess 112. The cover 9 is attached to the housing 1, with the tongue portion 93 disposed between the pair of the supporting portions 123. The pair of screws 6 are inserted into the mounting holes 124 of the housing 1 through the inserting holes 911 of the cover 9.

Figure 6:
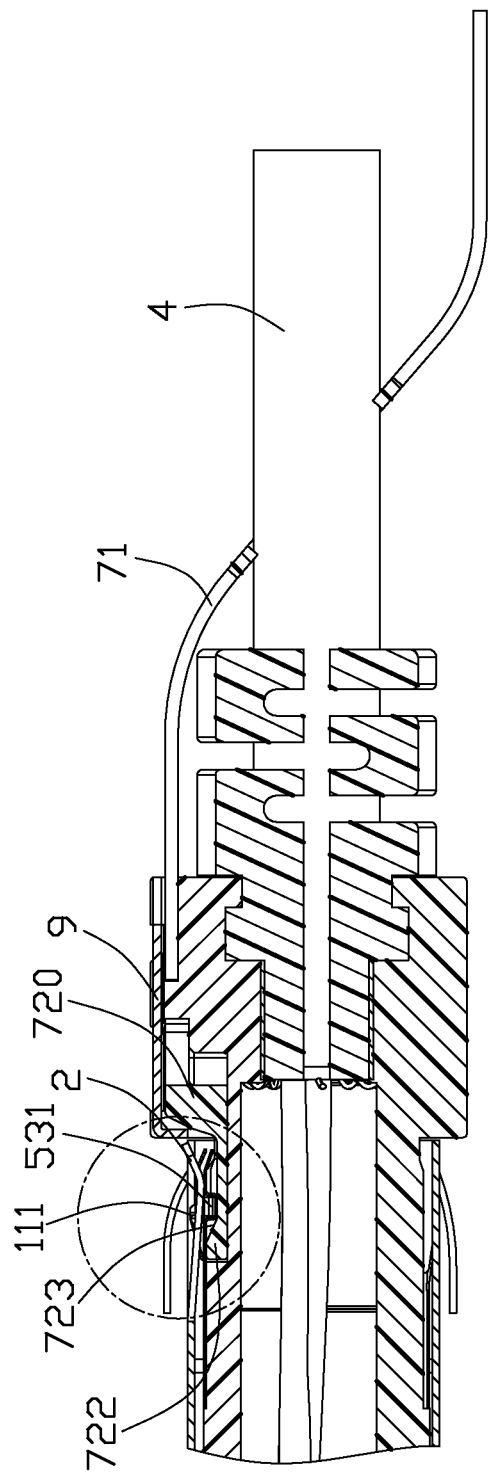
FIG. 6 is a partially cross-sectional view of the connector assembly in a latched position, taken along line 6-6 of FIG. 1.

In conjunction with FIG. 6, in a latched position, the latching nose 111 is engaged with the latching hole 21 of the receptacle connector 200.

Figure 7:
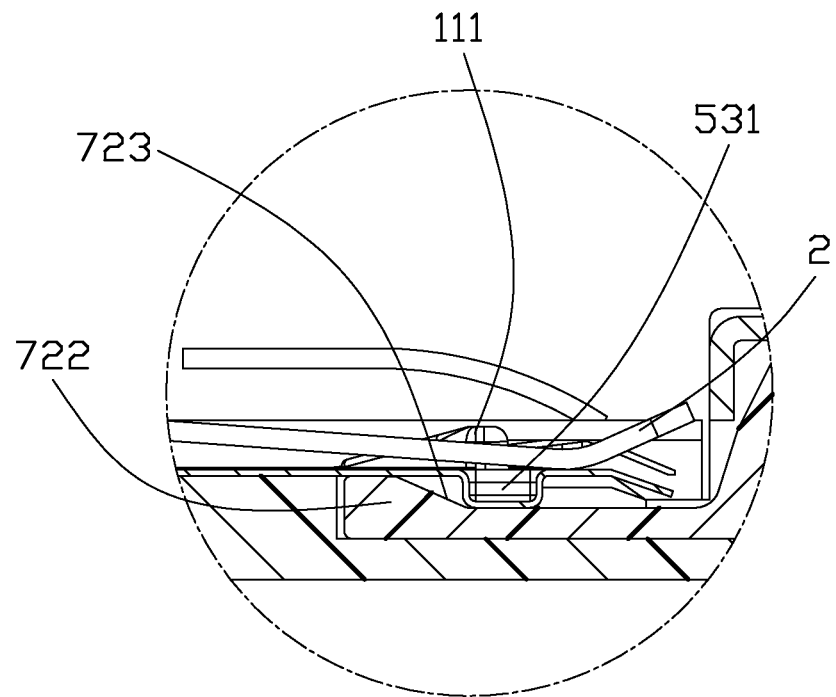
FIG. 7 is an enlarged cross-sectional view showing a cooperation of a guiding portion and a protrusion of the releasing mechanism marked in FIG. 6.
Figure 8:
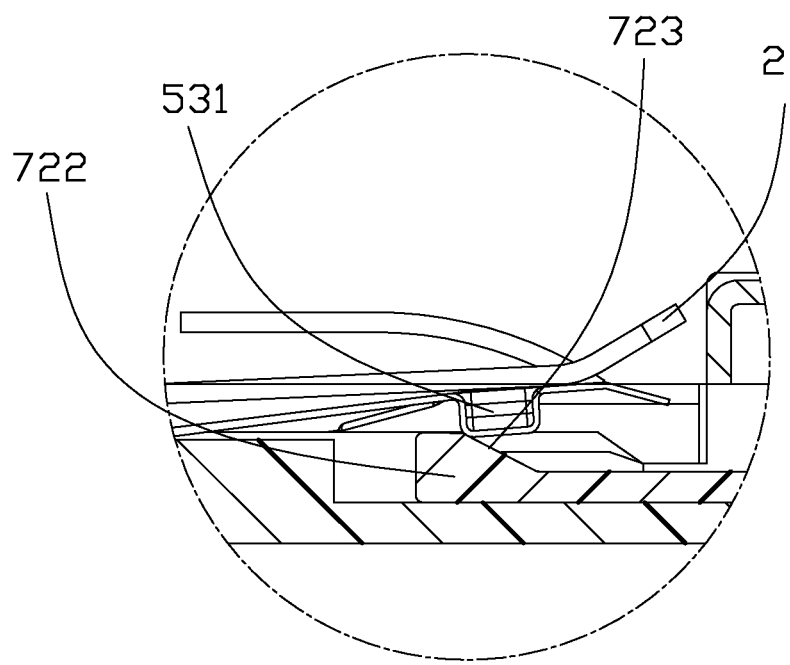
FIG. 8 is a view similar to FIG. 7, when the releasing mechanism is situated in a released position.

In conjunction with FIG. 7, when the puller 71 is pulled rearwardly, the guiding portions 722 slide beneath the protrusions 531 and guide the protrusions 531 together with the resisting beams 53 tilting upwardly. The resisting beams 53 lift the latching tab 2 from the latched position to a released position. The latching nose 111 is expelled outwardly from the latching hole 21 of the receptacle 200. The releasing mechanism is disposed in the released position.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A plug connector adapted for inserting into a receptacle having a latching tab defining a latching hole, comprising: a housing having a latching nose for latching with the latching hole of the receptacle; and a releasing mechanism comprising at least one resisting beam disposed on the housing and having a protrusion, a puller, and an operator connected with the puller and having at least one guiding portion projecting toward and in front of said protrusion, said at least one guiding portion being slidable, in response to a rearward movement of the puller, beneath the protrusion to tilt the at least one resisting beam upwardly and lift the latching tab from a latched position to a released position for releasing the latching nose from the latching hole, wherein said at least one guiding portion has a guiding face inclining rearwardly and downwardly for guiding the protrusion to climb on the guiding portion, wherein said releasing mechanism comprises a gasket attached to the housing, there are two resisting beams formed on the gasket, and there are two guiding portions each positioned between a corresponding resisting beam and the housing, wherein said housing has a pair of retaining recesses defined at two opposite sides of the latching nose, said operator having a pair of beam portions slidably accommodated in the pair of retaining recesses, said pair of guiding portions being respectively formed on the pair of beam portions.

2. The plug connector as claimed in claim 1, wherein said housing defines a receiving recess communicating with the pair of retaining recesses, said operator having a base portion connected with the pair of beam portions and slidably disposed in the receiving recess.

3. The plug connector as claimed in claim 2, wherein said operator has a body portion connected with the base portion, and said housing defines a primary recess accommodating the body portion.

4. The plug connector as claimed in claim 3, wherein said receiving recess is disposed at a level lower than that of the primary recess, and said housing has a portion disposed between the receiving recess and the primary recess for engaging the base portion.

5. The plug connector as claimed in claim 3, wherein said housing defines a pair of periphery recesses, said operator having a pair of resilient portions extending from the body portion and compressibly received in the periphery recesses.

6. A connector assembly comprising: a receptacle having a latching tab defining a latching hole; and a plug connector including: a housing having a latching nose for latching with the latching hole of the receptacle; and a releasing mechanism comprising at least one resisting beam disposed on the housing and having a protrusion, a puller, and an operator connected with the puller and having at least one guiding portion projecting toward and in front of the protrusion, said at least one guiding portion being slidable, in response to a rearward movement of the puller, beneath the protrusion to tilt the at least one resisting beam upwardly and lift the latching tab from a latched position to a released position for releasing the latching nose outwardly from the latching hole of the receptacle, wherein said at least one guiding portion has a guiding face inclining rearwardly and downwardly for guiding the protrusion to climb on the guiding portion, wherein said releasing mechanism comprises a gasket attached to the housing, there are two resisting beams formed on the gasket, and there are two guiding portions each positioned between a corresponding resisting beam and the housing, wherein said housing has a pair of retaining recesses defined at two opposite sides of the latching tab, said operator having a pair of beam portions slidably accommodated in the pair of retaining recesses, said pair of guiding portions being respectively formed on the pair of beam portions.

7. The connector assembly as claimed in claim 6, wherein said housing defines a receiving recess communicating with the pair of retaining recesses, said operator having a base portion connected with the pair of beam portions and slidably disposed in the receiving recess.

8. The connector assembly as claimed in claim 7, wherein said operator has a body portion connected with the base portion, said housing defines a primary recess accommodating the body portion.

9. An electrical connector comprising: a housing equipped with a latching nose for latching with a latching hole in a latching tab of a cage which is adapted to receive therein said housing wherein said latching tab is up and down deflectable in a transverse direction which is perpendicular to a lengthwise direction along which the housing is inserted into or withdrawn from the cage; and a releasing mechanism associated upon the housing and back and forth moveable relative to the housing along said lengthwise direction for unlatching the housing from the cage, and defining a front operator and a rear puller commonly moveable along the same lengthwise direction relative to the housing; wherein said operator defines an outward projecting portion for actuating outward deflection of the latching tab when rearwardly moving the puller so as to unlatch the housing from the cage, wherein said releasing mechanism further includes a resilient beam directly confronting the outwardly projecting portion; wherein the outwardly projecting portion is adapted not to directly confront the latching tab but the resilient beam and directly deflect outwardly the beam which is adapted to directly confront the latching tab and outwardly deflect the latching tab outwardly, wherein said resilient beam is equipped with an inward protrusion confronting the outwardly projecting portion, wherein the said resilient beam is formed on a gasket which surrounds the housing.

10. The electrical connector as claimed in claim 9, further including a cable extending rearwardly from a rear end of the housing, wherein the puller and the operator are essentially located on two opposite sides of the cable in the transverse direction.

11. The electrical connector as claimed in claim 9, wherein the operator is equipped with a spring structure to provide restoration force upon the operator for urging the operator back to an inner original position when said operator is moved to an outwardly releasing position by the puller.

\* \* \* \* \*